June 22, 1937.  P. W. COWAN  2,084,573
PERFORATOR FOR PRINTING PRESSES
Filed May 13, 1936
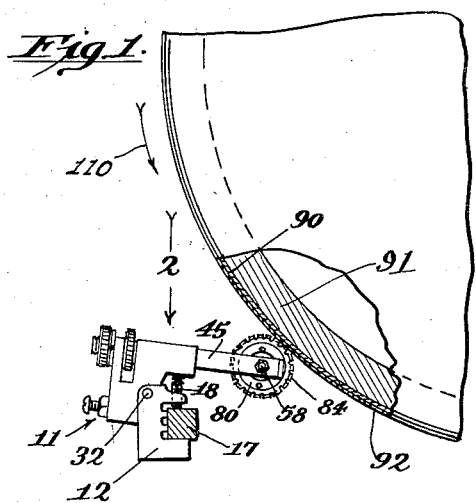
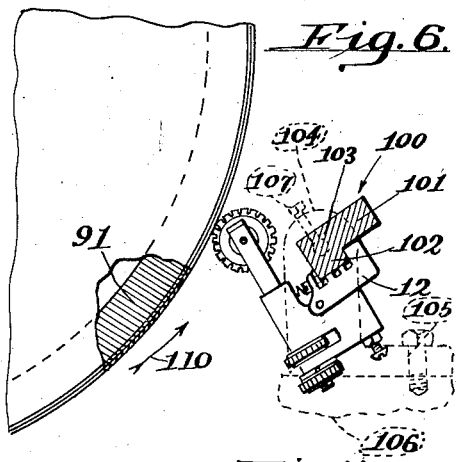
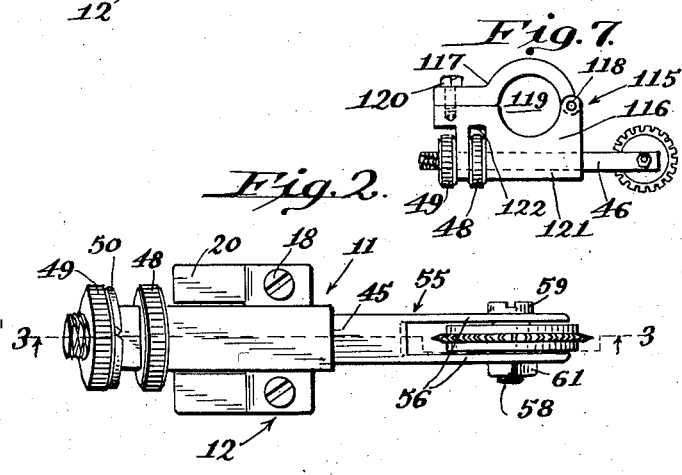
Inventor
Park W. Cowan
by Hazard and Miller
Attorneys.

Patented June 22, 1937

2,084,573

UNITED STATES PATENT OFFICE 2,084,573

PERFORATOR FOR PRINTING PRESSES

Park W. Cowan, Hollywood, Calif.

Application May 13, 1936, Serial No. 79,516

11 Claims. (Cl. 164—100)

My invention relates to rotary perforators used in connection with printing presses to perforate the paper passing over a roll, the rotary perforator cutting through the paper while in contact with the roll.

In this type of device an object and feature of my invention resides in a carrier or holder having one portion with a notch or groove for attachment to a supporting bar and a block pivoted thereto, the cutting implement being adjustably mounted on the block in order to bring the perforating wheel or disc into proper engagement with the paper to be perforated. In this connection the block pivotally mounted on the lower part of the carrier is restrained by a screw from moving in one direction but held in adjusted position by a spring, which spring may yield to allow the block and hence the perforating wheel or disc to move in the direction of the compression of the spring.

Another feature of my invention as it relates to the mounting of the perforating wheel or disc is having the block portion of the carrier or holder provided with a longitudinal guide opening preferably square in cross section in which is adjustably mounted a shank having the perforating disc on one end. This shank has screw threads thereon and is operated by an impression nut which fits in a transverse notch in the holder block, the shank being locked by a lock nut. Another detail feature in this regard is providing the shank with a yoke on the end through the arms of which extends an axle bolt forming the axle on which the perforating disc or wheel rotates.

Another object and feature of my invention is in an anti-friction, such as a ball bearing mounting, for the perforating wheel or disc, this mounting being of such construction that the perforating portion of the disc may be readily removed and replaced by another perforating element in order to obtain a variation in the number of perforations per unit of length.

A further feature of my invention relates to the anti-friction or ball bearing mounting for the removable and replaceable perforating discs or rings. In this arrangement the inner race of the bearing fits on the axle mounted in the yoke on the shank, the outer race having a protective guard and the bearing is formed with a collar having a tight fit with the guard and the outer race.

I secure a sleeve with an annular flange to the collar of the ball bearing. The portion of the sleeve at one side of the flange is tilted and on this is threaded an annular ring or removable flange which is used to clamp or secure the ring forming the perforating disc attached to the sleeve. The perforating ring is caught by a pin and perforation connection to the fixed flange of the sleeve and as the removable flange is easily attached and detached, provision is made for quickly changing the perforating discs to vary the number of spaces per unit of length.

A further feature of my invention is in the employment of an angle shaped bar pivoted at its ends in the frame of the press and hence adjustable as to angularity for supporting the series of holder blocks having perforations.

My invention is illustrated in connection with the accompanying drawing in which:

Figure 1 shows a side elevation of my invention attached to a supporting bar or the like and illustrating the perforating disc operating on paper passing over a cylinder of a printing press.

Figure 2 is a plan of the perforator taken in the direction of the arrow 2 of Figure 1, the perforator being removed from the supporting bar and the roll of the printing press.

Figure 3 is a longitudinal section on the line 3—3 of Figure 1 illustrating the perforating disc assembly in side elevation.

Figure 4 is a transverse section on the line 4—4 of Figure 3 in the direction of the arrows.

Figure 5 is a transverse section on the line 5—5 of Figure 3 in the direction of the arrows through the ball bearing assembly for the perforating disc, this being on an enlarged scale.

Figure 6 shows an alternative mounting of the perforator on an adjustable angle shaped supporting bar.

Figure 7 is an elevation of a non-pivoted mounting for the perforator.

In my invention the perforator as a whole, designated by the numeral 11, employs a carrier or holder 12 which is shown somewhat in the form of a rectangular block with a groove 13 in one side, with ribs 14 extending into the groove, such groove being defined by the base portion 15 at the bottom and the top portion 16 of the holder block, this being such that the groove provides a space in which is accommodated a transverse bar 17 which may be a brush bar or similar bar used in connection with the printing press extending transversely adjacent a press cylinder. The carrier or holder is clamped to the bar 16 by means of the set screws 18. The opposite side of the holder block is provided with a recess 19 with ears 20 on opposite sides of this recess. The block has a sloping surface 21 on the back of the portion 16 and a vertical surface 22 forming the base of the recess 19.

A pivoted upper block 25 has an upper part 26 with a longitudinal square opening 27 extending therethrough from the front face 28 to the rear face 29. This block has parallel sides 30 and has a dependent end structure 31 through which the pintle pin 32 extends, this pin being mounted in the ears 23 of the lower block. This lower portion has a front sloping surface 33 conforming somewhat to the slope 21 on the lower block. There is a transverse slot 34 intersecting the square opening 27. The device is adjusted by means of an adjusting screw 35 which extends through the lower portion of the block being threaded therein except for convenience a recess 36 is provided for a major portion of the screw, such screw has a curved head 37 and is locked by a lock nut 38. The inner end of the screw is adapted to engage the vertical base 22 of the recess 19 slightly below the sloping surface 21. A compression spring 39 is seated respectively in a recess 40 in the portion 19 of the lower block and a recess 41 on the underside of the block 25 adjacent its front end 28.

A shank 45 extends through this opening 27. Such shank has a portion indicated 46, square in cross section, and threaded on the corners 47. These threads are engaged by an impression nut 48 fitted in the transverse slot 34 and by a lock nut 49, this latter being at the outer end of the shank, there being preferably a split washer 50 between the nut 49 and the rear face 29 of the block 25. The outer end of the shank 45 has a yoke 55 with two arms 56, these being illustrated as having bosses 57 facing each other and through these bosses extends the axle pin 58 having a head 59 with a kerf therein, a threaded end 60 with a nut 61.

The ball bearing assembly structure for the perforator defined by the assembly numeral 65, employs an inner ball race 66 fitting on the shaft bolt 58, an outer race 67 with the anti-friction balls therebetween. A cover sleeve 69 fits over the outer race and outside of this is a collar 70. These parts of the ball bearing are purchased and obtained as a unit. To this unit I secure a sleeve 71 which sleeve has a cylindrical part 72, the outer portion of which is exteriorly threaded as indicated at 73 and there is an annular flange 74. A removable ring or flange 75 is threaded on the threads 73, there being sockets 76 in these flanges for a spanner wrench whereby the perforating ring or disc 80 is clamped between the two flanges. The inner periphery 81 of this ring preferably has a snug fit on the cylindrical portion of the sleeve 71. A pin 82 on the fixed flange extends through a perforation 83 in the perforating ring and prevents this from rotating independently of the outer race of the ball bearing. The perforating edge 84 of the perforator disc or ring is cut to a sharp peripheral edge with spacer slots 85. With my invention it will be readily apparent that these wheels or perforating discs may thus be readily changeable having a different number of slots to the inch of the periphery, that is, the inch of paper perforated. I provide for purchase perforating wheels having 2, 3, 4, 6, 8 and 12 slots to the inch, however, the 8 to the inch slotted wheels are those most commonly used.

In using my invention a metal band 90, preferably of steel, is clamped around the periphery of a roll or drum 91. The paper to be perforated, indicated at 92, lies over the metal band and is thus engaged by the perforating wheels. It will be noted by the construction of the spring 39 and the set screw 35, that a pressure downwardly on the perforating wheel compresses the spring 39 and allows the upper block 25 to tilt downwardly with the perforating wheel. This withdraws the set screw 35 slightly out of contact with the bottom 22 of the recess 19 but when the spring returns the shank and the cutting wheel to its original position, the set screw again contacts the surface 22, thus maintaining the perforating wheel in the proper position and with the proper spring pressure against the paper. It is manifest that the impression nut 48 and the locking nut 49 may afford an accurate adjustment of the perforating wheel in regard to the work to be done and on account of the shank being square in cross section, it is not necessary to use a key or spline to prevent rotation of the shank. On account of having the anti-friction bearing it is not necessary to lubricate the perforator and therefore there is no danger of oil marring the paper being perforated and also manifestly the perforator operates with but little friction.

In Figure 6, I show a mounting of the carrier block and perforator on the rear side of the press drum. In this case an angle bar 100 has preferably a long flange 101 and a short wide flange 102 on which the carrier or holder block 12 is clamped. In this case the base portion 15 may contact one side of the long flange 101. This bar has a pivot shaft 103 at each end and is rotatably mounted in a bracket 104, such is indicated as secured by bolts 105 to a portion of the frame 106 of the printing press. A set screw 107 is used to clamp the angle bar at any desired degree of angularity.

It will be noted that the same carrier or holder 12 and the same type of mounting for the perforator is used in Figure 1 as in Figure 6. In these figures the drum 91 rotates in the direction of the arrow 110 of Figures 1 and 6. Figure 1 illustrates the perforator as being on the front or forward side of the drum and Figure 6, the perforator being on the rear side of the drum. These constructions are for installations where the drum has a slight up and down movement during the operation of printing. The spring 39 in both installations allows the perforator to slightly yield as the drum comes down and to swing outwardly or upwardly to maintain a contact with the drum as it moves upwardly. The adjusting screw 35 gives a positive limit to the oscillating movement of the perforator. A feature of having the angle shaped bar 100 is that this has increased strength over a bar rectangular in section as shown at 17 in Figure 1. As it is sometimes difficult to purchase in a commercial manner these strong angle shaped bars, they can be built up by using two bars rectangular in cross section attached together in any suitable manner to form the angle shape. An important feature of having the bar 100 rotatably adjustable in its supporting brackets is that this may be rotated on its axis to locate the perforating disc in the correct position for accurate perforating of the paper passing over the drum.

Figure 7 is an elevation of an installation in which the pivoting or resilient mounting of the perforator is not necessary. In this construction I use a clamp 115 having a substantial block 116 and cooperating with this is a pivoted jaw 117, the pivot being indicated at 118. It is usual for these jaws when closed to provide a cylindrical opening 119 to engage a round bar. The block and the jaw are held in clamped position by a screw or bolt 120. In this construction the block 116 is provided with a guide opening 121 preferably square in cross section. A transverse notch 122 intersects this guide opening so that the shank 46 of the perforator assembly may extend through this guide opening and be secured in place by the impression nut 48 and the lock nut 49. By this construction on account of having the opening in the jaws cylindrical as indicated at 119, the clamp may be rotated on its holding bar to bring the perforator into correct position with the drum of the press. This type is used with presses in which the drum over which the paper passes does not have an up and down or similar movement.

Various changes may be made in the details of construction without departing from the spirit or scope of the invention as defined by the appended claims.

I claim:

1. A perforator for printing presses having a holder body with means for attaching same to a cross bar, said body having a bore therethrough and a notch transverse to the bore, a shank slidably mounted in the bore and having a threaded section with a nut in the notch threaded thereon, and a lock nut on the end of the shank, the opposite end of the shank being split and having a rotary perforating disc journaled therein, and means to prevent rotation of the shank in said bore.

2. A perforator as claimed in claim 1, the holder body being formed with a lower part having a socket at the back, and an upper part pivotally mounted at the upper part of such socket, an adjusting screw extending through the upper part and engaging a face of the socket to prevent tilting of the arm part in one direction, and a spring between the upper and lower parts giving a resilient pressure on the tilting of the upper part with a shank and perforator in the opposite direction.

3. A perforator for printing presses having a holder body with upper and lower parts and means to clamp the holder body to a transverse bar, the body having a square bore therethrough and a notch across the bore, a shank square in cross section slidable in the bore, a nut in the notch threaded on the shank, a locking nut on the end of the shank engaging one end of the body, the shank having a split end with a rotary perforating disc mounted therein.

4. A perforator as claimed in claim 3, the lower part of the body having a transverse notch to engage the cross bar and a vertical socket at the back, the upper part being pivoted in said socket, an adjusting screw extending through the lower section of the upper part and engaging the back face of the socket, the upper and lower sections having opposite recesses, and a compression spring fitted in said recesses.

5. A perforator having a supporting structure with a shank adjustably mounted therein, the shank having a yoke, an anti-friction bearing mounted in the yoke, having an inner and an outer race, a sleeve structure, means securing said sleeve to the outer race, a perforating ring having a perforating edge interrupted by transverse slots and means to attach said ring to the sleeve whereby the said ring may be disconnected from the sleeve and a replacement ring substituted therefor.

6. A perforator as claimed in claim 5, the sleeve having a flange formed integral therewith on one side and having a flange threaded on the sleeve, the two flanges forming the means for attaching the perforating ring to the sleeve.

7. In a perforator, a perforating wheel having an anti-friction bearing with an inner and an outer race, a sleeve, means securing the sleeve to the outer race, said sleeve having an integral annular flange, a portion of the sleeve being exteriorly threaded, a removable ring threaded thereon and forming a complementary flange, a perforating ring or disc mounted on the sleeve and clamped between the annular flange and the removable ring, said perforating ring having an annular sharp cutting edge interrupted by transverse slots.

8. A perforator for printing presses comprising in combination an angle shaped bar rotatably mounted in relation to the frame of the press, a holder mounted on the bar having a fixed and a pivoted portion, a shank adjustably mounted in the pivoted portion and a perforating disc on the shank whereby the angular position of the bar may be varied and the perforating disc adjusted to engage paper on a drum of a press.

9. A perforator for printing presses comprising in combination a bar L-shaped in cross section, brackets having means for attachment to the frame of a printing press, means to adjust said bar on its axis in the said brackets, a holder attached to the bar, a perforating disc connected to the holder whereby the bar may be rotated on its axis to locate the disc in proper relation to the periphery of the drum of the press.

10. A perforator for a printing press comprising in combination a clamp having a block with a pivoted jaw, there being a cylindrical opening formed by the block and the jaw when in clamping relation, whereby the clamp may be adjusted on a cylindrical bar, the block having a guide opening therethrough, a shank extending through said opening and having a perforating disc at one end and means to adjust said shank in relation to the said block.

11. A perforator having a supporting structure with a shank adjustably mounted therein, the shank having a yoke, a bearing having a fixed and a rotatable part mounted in the yoke, a sleeve structure, means securing said sleeve to the outer part of the bearing, a perforating ring having a perforated edge interrupted by transverse slots and means to attach said ring to the sleeve whereby the ring may be disconnected from the sleeve and a replacement ring substituted therefor, the sleeve having an integral flange extending therefrom on one side, a removable ring threaded on the sleeve and forming a complementary flange, the flange and the ring forming means for attaching the perforating ring to the sleeve and means interconnecting the perforating ring and the sleeve to prevent rotation of the perforating ring on the sleeve.

PARK W. COWAN.